United States Patent [19]

Tanioka et al.

[11] Patent Number: 5,093,655
[45] Date of Patent: Mar. 3, 1992

[54] LIQUID-CRYSTAL DISPLAY APPARATUS

[75] Inventors: Atsuyoshi Tanioka; Tatsuo Katagishi; Hajime Takesada, all of Kobe, Japan

[73] Assignee: Sanyo Electric Co., Ltd., Osaka, Japan

[21] Appl. No.: 675,052

[22] Filed: Mar. 25, 1991

Related U.S. Application Data

[63] Continuation of Ser. No. 373,709, Jul. 3, 1989, abandoned, which is a continuation of Ser. No. 65,219, filed as PCT/JP86/00525, Oct. 16, 1986, abandoned.

[30] Foreign Application Priority Data

Oct. 16, 1985 [JP] Japan .............. 60-157970[U]
Nov. 13, 1985 [JP] Japan ............... 60-254145
Dec. 11, 1985 [JP] Japan ............... 60-278521

[51] Int. Cl.$^5$ ........................................ G09G 3/36
[52] U.S. Cl. ........................... 340/784; 340/805
[58] Field of Search ............ 340/765, 784, 811, 812, 340/813, 814, 789, 802, 805; 350/332, 333

[56] References Cited

U.S. PATENT DOCUMENTS

| | | | |
|---|---|---|---|
| 4,027,305 | 5/1977 | Kishimoto | 340/765 |
| 4,200,868 | 4/1980 | Lamoureux et al. | 340/789 |
| 4,413,256 | 11/1983 | Yasuda et al. | 340/765 |
| 4,476,466 | 10/1984 | Mitani et al. | 340/805 |
| 4,525,710 | 6/1985 | Hoshi et al. | 340/765 |
| 4,556,880 | 12/1985 | Hamada | 340/784 |
| 4,591,848 | 5/1986 | Morozumi et al. | 340/784 |
| 4,622,590 | 11/1986 | Togashi | 340/811 |
| 4,710,768 | 12/1987 | Takeda et al. | 340/784 |
| 4,724,433 | 2/1988 | Inoue et al. | 340/784 |
| 4,909,607 | 3/1990 | Ross | 340/784 |

FOREIGN PATENT DOCUMENTS

55-129399 10/1980 Japan .
59-220793 12/1984 Japan .
60-3698 1/1985 Japan .

Primary Examiner—Alvin E. Oberley
Assistant Examiner—Richard Hjerpe
Attorney, Agent, or Firm—Armstrong, Nikaido, Marmelstein, Kubovcik & Murray

[57] ABSTRACT

A liquid-crystal display apparatus visually compensates the flickers of the entire face of the liquid-crystal panel through reversing the polarity of the picture signals in adjacent columns to be applied to drive the liquid-crystal panel with a plurality of display picture-elements. The polarity is reversed for each of the display picture element, of at least one or more adjacent within at least the same row, and/or for at least one horizontal scanning period or more.

2 Claims, 13 Drawing Sheets

Fig. 15(c) PRIOR ART under pseudo color contour line also at the picture face through the above-described brilliance level adjusting circuit.

LIQUID-CRYSTAL DISPLAY APPARATUS

This application is a continuation of application Ser. No. 373,709 filed July 3, 1989, now abandoned, which is a continuation application of Ser. No. 65,219, filed as PCT/JP86/00525, Oct. 16, 1986, now abandoned.

ART FIELD RELATED WITH THE INVENTION

The present invention relates to a liquid-crystal display apparatus using a liquid-crystal matrix panel, and particularly to the driving circuit.

BACKGROUND ART

In recent years, the development of the liquid-crystal television of a portable type using the liquid-crystal matrix panel is actively performed, the details are introduced at page 211 through page 240 of, for example, "Nikkei Electronic No. 351" (issued Sept. 10, 1984).

Figure 11:
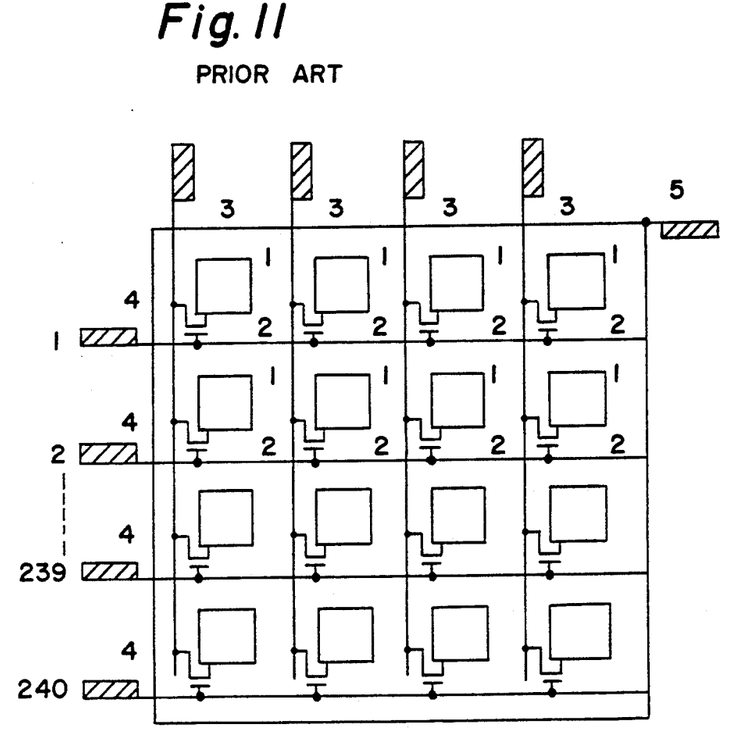
FIG. 11 is an electrode circuit diagram of the active matrix panel of the conventional 240 rows.

One example of the electrode circuit diagram of the active matrix panel using TFT (thin film transistor) in the liquid-crystal television is shown in FIG. 11. In FIG. 11 segment electrodes (1), (1) are formed on the first base plate, the TFTs (thin film transistor) (2), (2) are formed on the first base plate, corresponding to the respective segment electrodes (1), (1) and the TFTs, are connected with the segment electrodes (1) at the sources of the TFTs (2). Drain lines (3) are connected with the drains for each of the columns of the TFT (2) corresponding to the segment electrodes (1) of the column direction, gate lines (4) are connected with the gates for each of the rows of the TFT (2) corresponding to the segment electrodes (1) of the row direction.

A common electrode (5) is formed on the second base plate opposite to the first base plate with each of the segment electrodes (1), the TFTs (2) the drain lines (3), the gate lines (4) being formed thereon. The liquid crystal is filled between the first, second base plates.

The number of the rows, i.e., the number of the gate lines (4) is 240, corresponds to approximately the number of effective scanning lines among the number of the scanning lines 262.5 of one field of the NISC system.

Thus, all the 240 are used respectively in the odd-number field and the even-number field during the driving operation, the same element is driven after 1/60 seconds.

Figure 12:
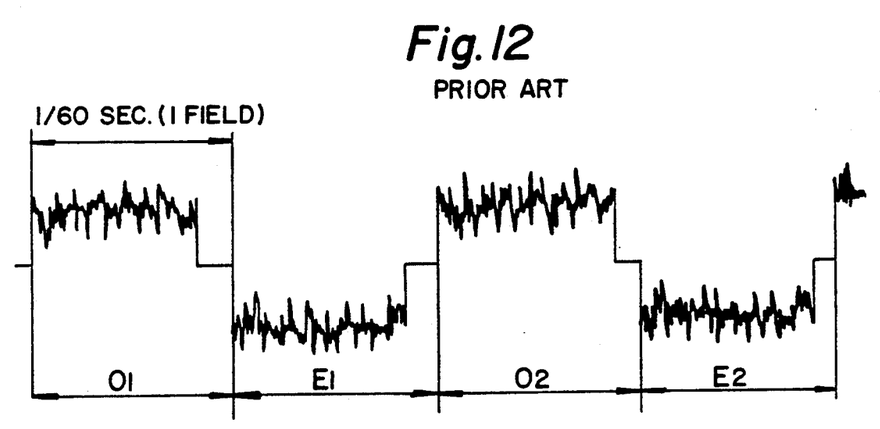
FIG. 12 is a picture signal waveform chart to be applied upon the panel of FIG. 11.

Picture signals are applied upon the drain lines (3) of the active matrix panel, and when the liquid crystal is normally driven, the AC driving is preferable, namely, the polarity of the signal is desired to be inverted at a given period through the consideration of the durability or the like when the liquid crystal is normally driven, with the picture signal becoming like, for example, FIG. 12.

Namely, assume that the nth of the odd-number field is On, the nth of the even-number field is En, the polarity is reversed for each of the fields as the odd-number fields (01), (02) become positive in polarity, the even-number fields (E1), (E2) become negative in polarity.

Thus, the period by which the same element is driven by the same polarity becomes 1/30 seconds, i.e., one frame period. Accordingly, the flicker (flitting) on the picture face by the polarity reversion is hardly conspicuous.

However, in the above-described conventional example, the number of the rows is 240 with the number of the picture elements being limited, thus providing the picture face comparatively low in resolving degree.

Thus, the method of improving the picture quality is proposed with the number of the picture elements being increased such as 480 in the number of the rows.

Figure 13:
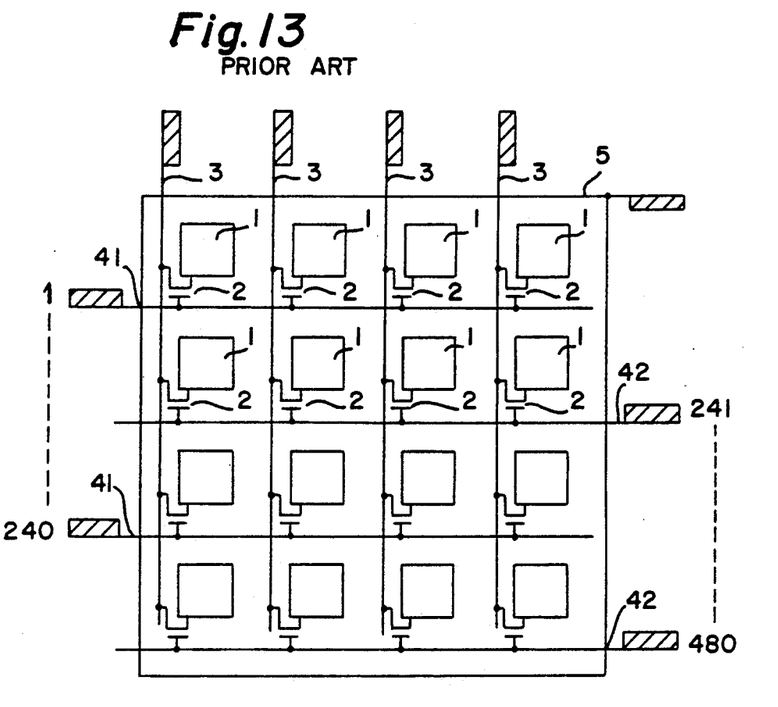
FIG. 13 is an electrode circuit diagram of the active matrix panel of the conventional 480 rows.

The electrode circuit diagram of the active matrix panel in the second conventional embodiment is shown in FIG. 13, the same numerals are given to the same portions as those of FIG. 11 to omit the description.

The gate lines (41), (42) . . . in FIG. 13 are 480, are respectively taken out to the left, and to the right for each of the rows, the gate signals are applied upon the gate line (41) . . . in the odd-number field, the gate signals are applied upon the gate line (42) . . . in the even-number field.

Figure 14:
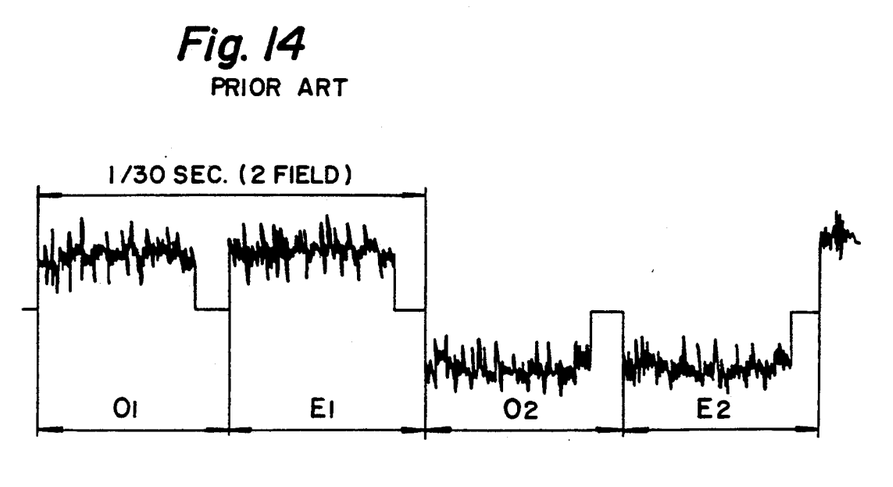
FIG. 14 is a picture signal waveform chart to be applied upon the panel of FIG. 13.

The picture signals to be applied upon the drain lines (3), (3) of the active matrix panel are reversed in polarity for each two-fields as shown in FIG. 14, so that the period by which the same element is driven by the same polarity becomes 1/15 seconds, namely, the two-frame period.

Thus, the flickers on the picture face by the polarity reversion became low in frequency, which was a very conspicuous defect.

Figure 15A:
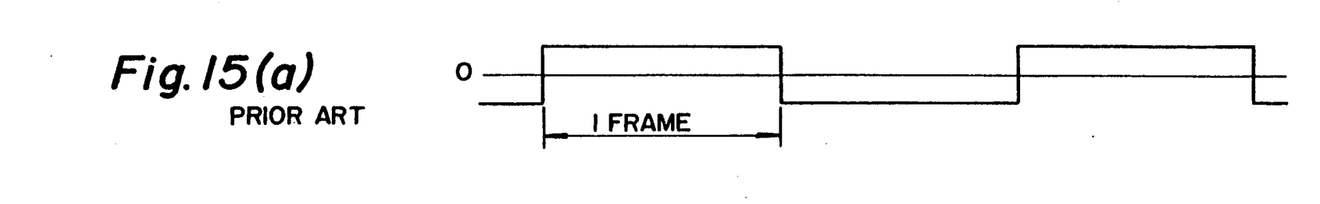
FIGS. 15(a), 15(b) and 15(c) are waveform charts for explaining the flickers.
Figure 15B:
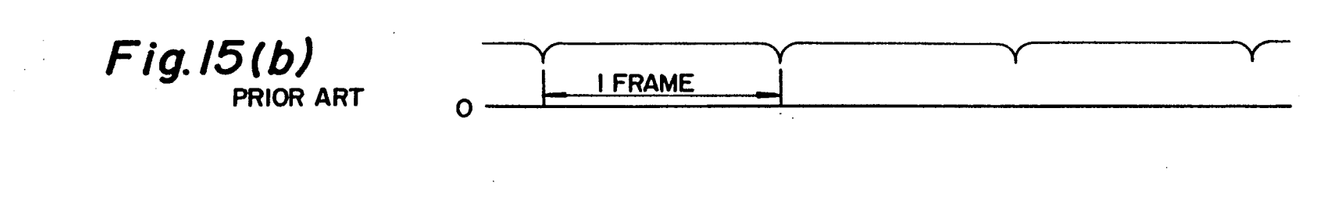
Figure 15C:
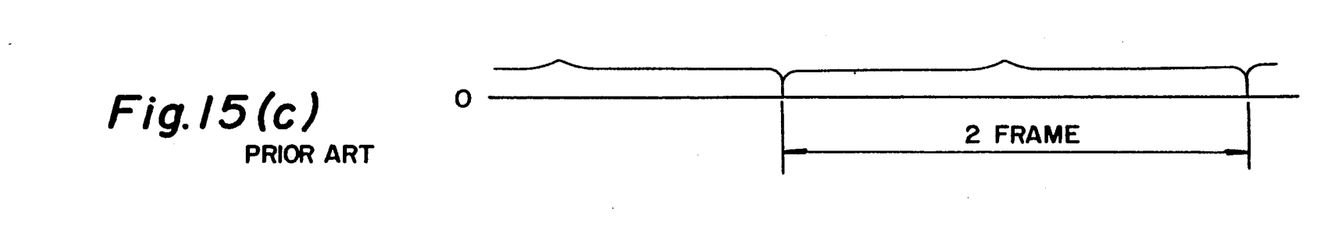

It is to be noted that the flickers are caused at the one-frame period as shown in FIG. 15(b) with respect to the driving waveform of the two-frame period shown in FIG. 15(a) when the LCD panel (1) is seen from the front face, but the brilliance is reduced as shown in FIG. 15(c) in a case where 10° is deviated from, for example, the front face when the LCD panel (1) is obliquely seen, the period of the flicker becomes also the two-frame period to make the flicker more conspicuous.

SUMMARY OF THE INVENTION

The present invention is provided to improve the disadvantages of the above-described conventional examples, an object of the present invention is to increase the number of the rows of the color matrix display apparatus from, for example, 240 to 480 to increase the number of the picture elements so that the flickers on the picture face through the AC driving operation of the liquid crystal is made inconspicuous. Thus, as the present invention is adapted to reverse the polarity of the picture signals to be applied for one display picture element adjacent within at least the same row or each plural-display picture elements, the flickers of the entire picture face is visually compensated by the above-described means.

Also, the present invention is adapted to reverse the polarity of the picture signal for one horizontal scanning period or for each plural-horizontal scanning periods so that the brilliance of each portion on the picture face becomes uniform by the above-described means, also, to prevent horizontal stripes.

Furthermore, the present invention proposes the driving circuit of the liquid-crystal display apparatus, which is composed of a liquid-crystal panel with a plurality of display elements being arranged in columns and rows thereon, a polarity reversion circuit for reversing for each field the polarity of the picture signal to be applied upon the liquid-crystal panel, a circuit for feeding the first or second DC voltage selected for each field to the opposite electrode of the liquid-crystal panel, and a brilliance level adjusting circuit for simultaneously mutually varying in the opposite direction the first and second DC voltages to adjust the brilliance level of the picture signal, so that the brilliance level may be varied without any changes in the DC level of the picture signal through the above-described means.

DESCRIPTION OF THE DRAWINGS

The liquid-crystal display apparatus in accordance with the present invention will be described hereinafter in detail with reference to the embodiment shown in the drawings.

DESCRIPTION OF THE PREFERRED EMBODIMENTS

Figure 1:
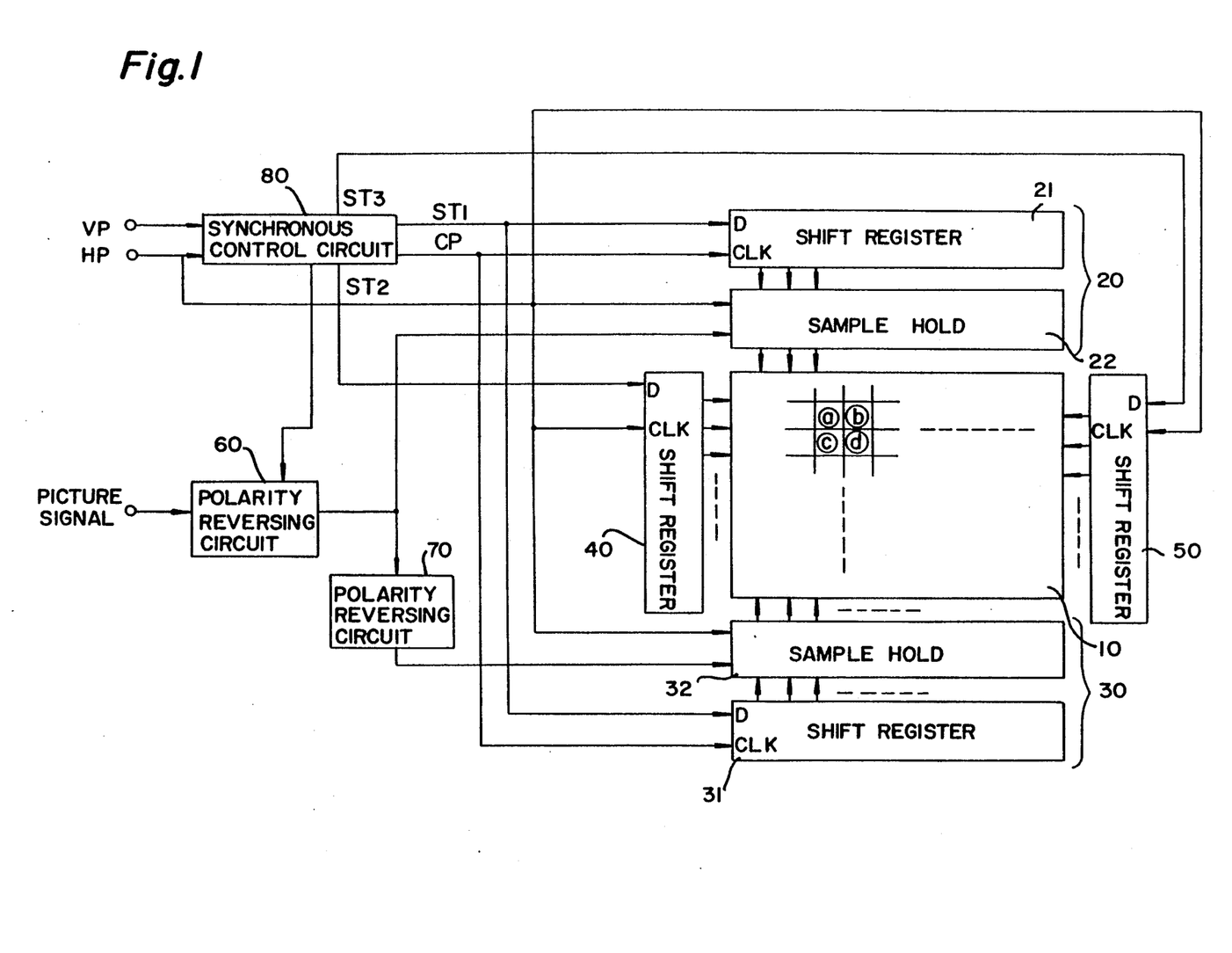
FIG. 1 is a block diagram of a driving circuit of the liquid-crystal display apparatus in one embodiment of the present invention.
Figure 2A:
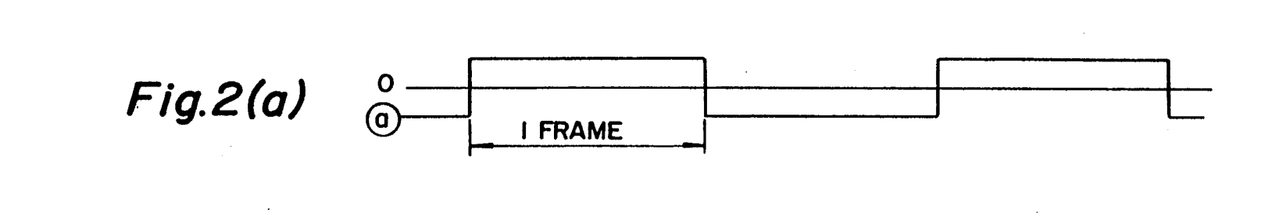
FIGS. 2a-2i are waveform charts in the essential portions of FIG. 1.
Figure 2B:
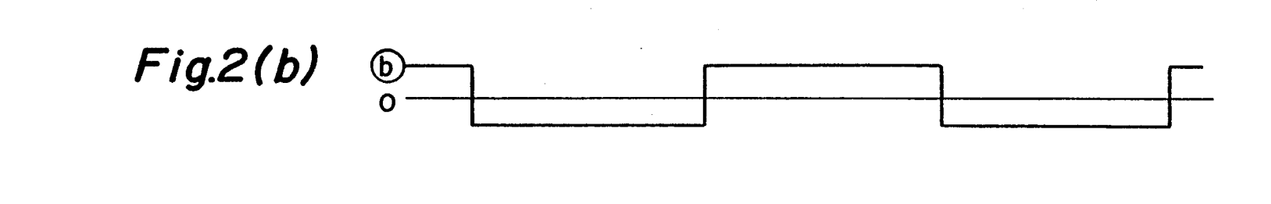
Figure 2C:
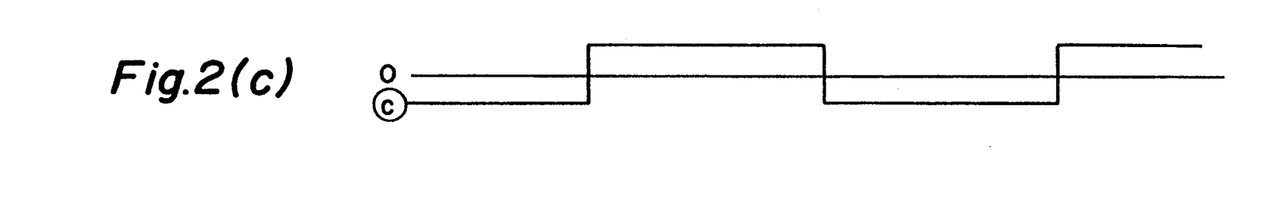
Figure 2D:
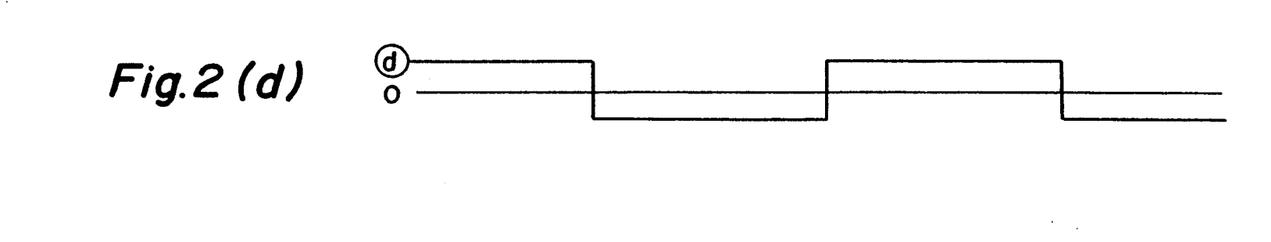
Figure 2E:
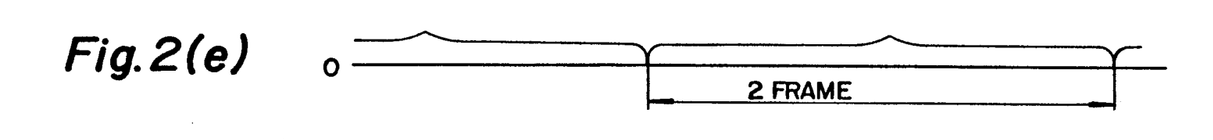
Figure 2F:
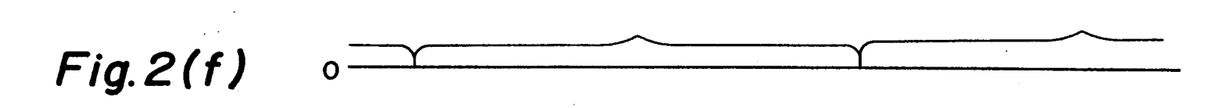
Figure 2G:
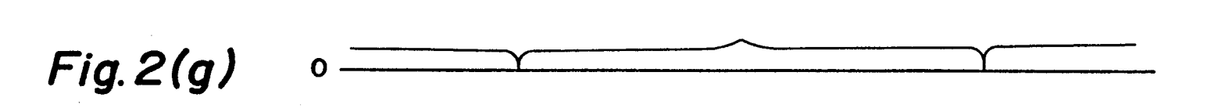
Figure 2H:
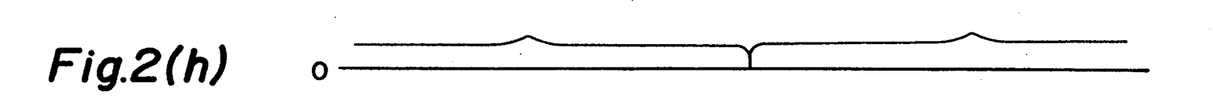
Figure 2I:
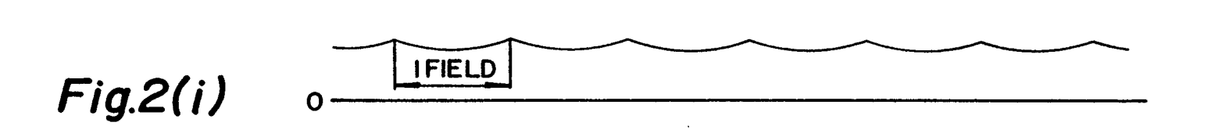

FIG. 1 and FIG. 2 show a first embodiment of the present invention.

FIG. 1 is a block diagram of the present embodiment circuit, which is broadly composed of an LCD panel 10, first and second column driving portions 20 and 30, first and second row driving portions 40 and 50, first and second polarity reversion circuits 60 and 70, and a synchronous control circuit 80.

The LCD panel 10 has a mosaic-shaped color filter opposed to the active matrix panels of 480 in the number of the rows, color unit display elements are arranged like G, R, B . . . sequentially in the horizontal direction for the upper left portion.

The first and second column driving portions 20 and 30 are composed of first and second shift registers 21 and 31 to which the clock pulse (CP) and the first start pulse ($ST_1$) are respectively fed from the synchronous control circuit 80. First and second sample hold circuits 22 and 32, are fed the output pulse of each digit of the shift register as the sampling pulse. The first and second sample hold circuits sample the picture signal outputs of the first or the second polarity reversing circuits 60 and 70 and hold them for one horizontal scanning period with the horizontal synchronous pulse (HP). The picture elements in the odd-numbered columns are driven by the first sample hold circuit output. The picture elements in the even-numbered column are driven by the second sample hold circuit output.

The first row driving portion 40 is composed of a shift register which inputs a) the second start pulse ($ST_2$) caused at the start of the odd-number field from the synchronous control circuit 80, and b) clock-inputs the horizontal synchronous pulse (HP). The respective digit outputs of the first driving portion 40 drive each gate line of the odd-numbered rows. Also, the second row driving portion 50 inputs a) the third start pulse ($ST_3$) caused at the start of the even field, b) clock-inputs the horizontal synchronous pulse (HP). The respective digit of the second column driving portion 50 drive each gate line of the even-numbered rows.

The first polarity reversing circuit 60 reverses in polarity the picture signal for each one frame by using the control signal from the synchronous control circuit 80. The output of the first polarity reversing circuit is fed into the first sample hold circuit 22.

Also, the output of the first polarity reversing circuit 60 is input, during all periods, into the second polarity reversing circuit 70 where the polarity of the picture signal for each frame is further reversed. The reversed output of the second polarity reversing circuit 70 is fed to the second sample hold circuit 32.

Thus, the signals to be applied upon the picture elements adjacent to the horizontal direction on the LCD panel 10 become mutually reversed in polarity.

Furthermore, the synchronous control circuit 80 contains the PLL circuit, is synchronous with the first start pulse ($ST_1$), the vertical synchronous pulse (VP) synchronized with the horizontal synchronous pulse (HP), is synchronous to the second start pulse ($ST_2$), the vertical synchronous pulse (VP) to be caused at the start of the odd-numbered field to compose the third start pulse ($ST_3$) to be caused at the start of the even-numbered field and the clock pulse (CP) which is the frequency-division output of the VCO within the PLL circuit.

According to the above-described driving circuit, the picture elements adjacent to the horizontal direction are driven by the image signals mutually reversed in electrode, so that the flickers caused through the AC driving of the adjacent elements are visually offset, the flittings on the whole picture face are hardly caused if the flicker of the individual picture element becomes a frequency as low as two frame periods.

Also, FIGS. 2a-2i are waveform charts for explaining the flickers in a case where the LCD panel 10 is seen from the direction deviated by 10° from the front face, FIGS. 2(a) through 2(d) respectively show the voltage waveforms having been kept on the picture elements ⓐ, ⓑ, ⓒ, ⓓ after applying driving signals on the LCD panel 10, FIGS. 2(e) through 2(h) show brilliance of each picture element. In this case, the flickers are caused with each picture element of four in the two-frame period, but the visual brilliance of FIG. 2(i) composes the brilliance of each picture element when four picture elements are regarded as one on the whole, the period of the flicker becomes one field to increase the frequency so that the flickers become substantially inconspicuous.

It is to be noted that in the above-described first embodiment, the polarity of the respective one picture element adjacent within at least the same row was reversed, but the polarity may be reversed for a respective plurality of adjacent picture elements.

According to the present invention as described hereinabove, in a liquid-crystal display apparatus wherein the picture signals reversed in polarity at the given period are applied upon the liquid-crystal with a plurality of display elements being arranged in rows and columns thereon, a liquid-crystal display apparatus characterized in that the polarity of the picture signal to be applied is reversed for one or a plurality of display elements adjacent within at least the same row is newly provided, so that the number of the rows of the color LCD panel is made 500, the flickers are adapted not to be caused on the individual picture elements, through the driving operation by an interlace system.

Also, the flickers may be visually compensated, if the frequency of the flicker of the picture element is reduced as compared with when the panel of the color LCD is seen from the front face, when it is seen obliquely.

SECOND EMBODIMENT

Figure 3:
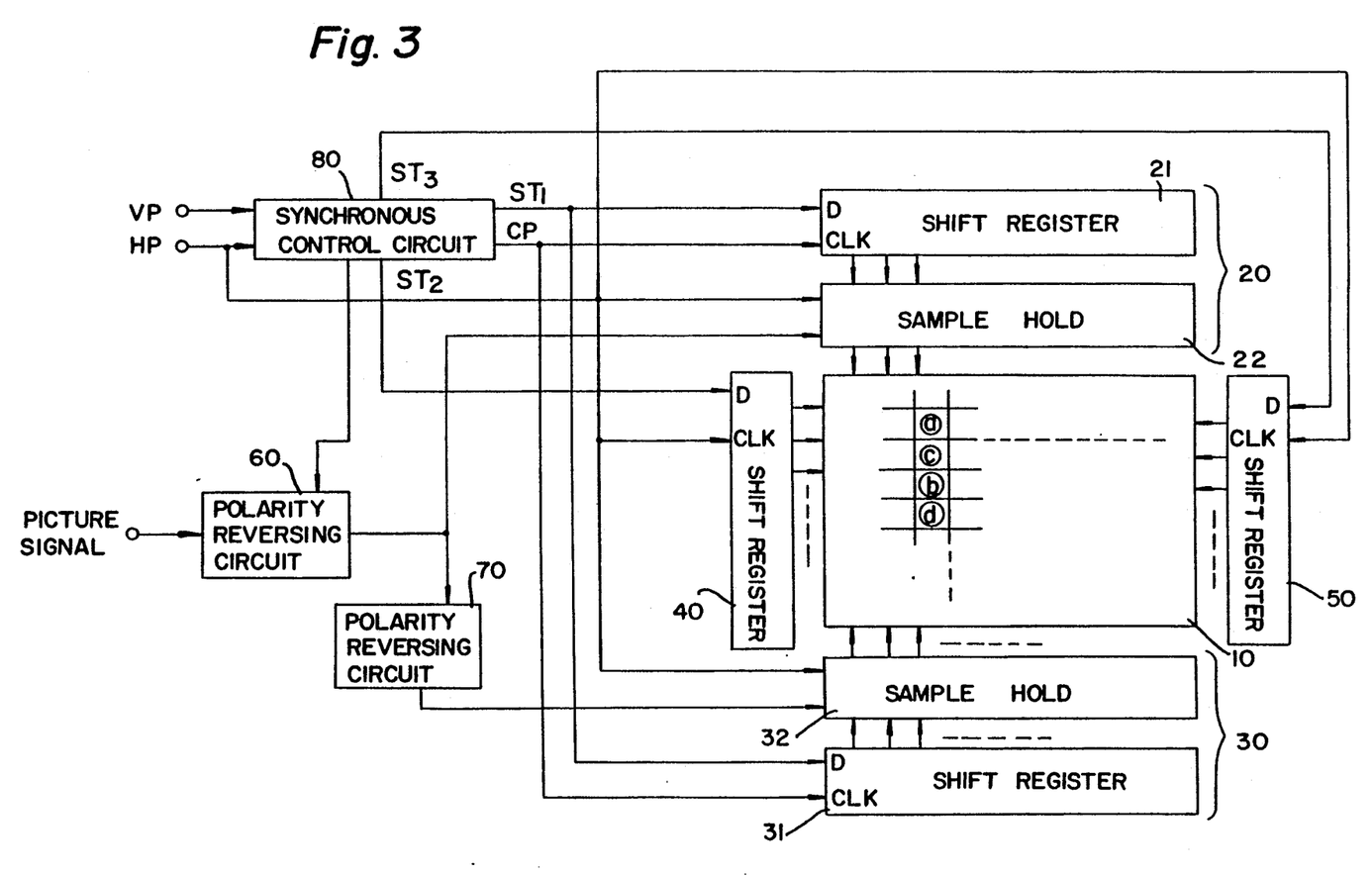
FIG. 3 is a block diagram of the driving circuit of the liquid-crystal display apparatus in the second embodiment of the present invention.
Figure 4:
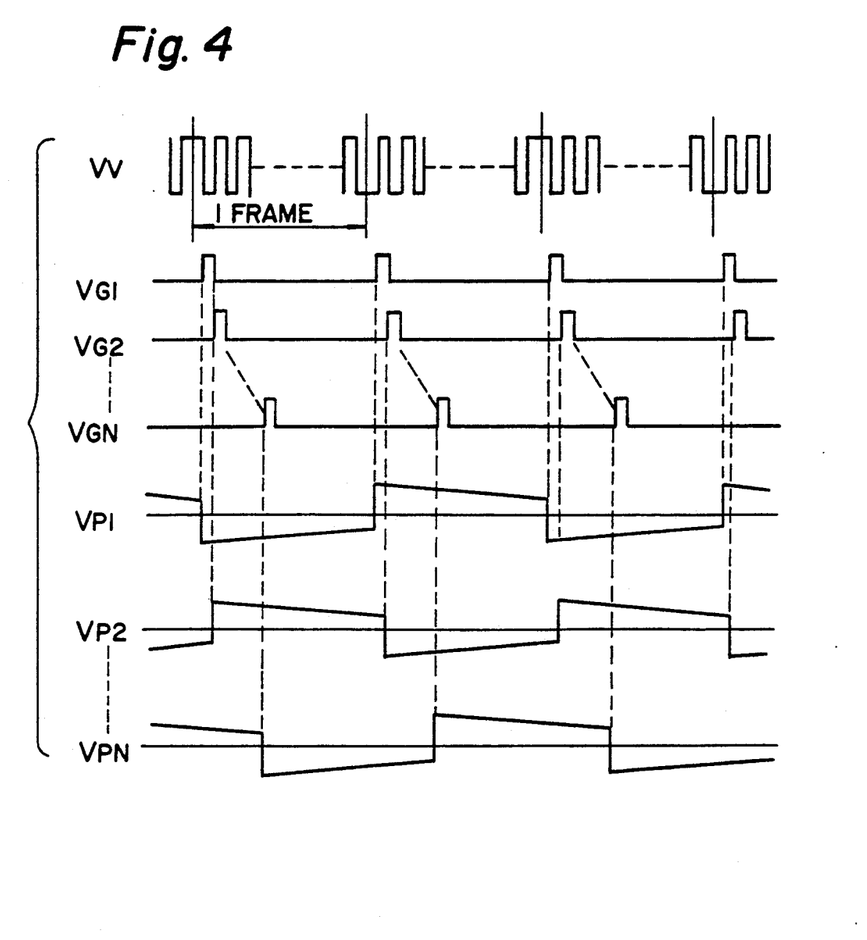
FIG. 4 is the waveform chart in the essential portions of FIG. 2.

FIG. 3 and FIG. 2 and FIG. 4 show a second embodiment of the present invention.

FIG. 3 is a block diagram of the circuit of the present embodiment, each circuit construction to be composed of an LCD panel 10, first and second column driving portions 20 and 30, first and second row driving portions, first and second polarity reversing circuits 60 and 70, a synchronous control circuit 80 is completely the same as those of FIG. 1, with the description being omitted.

The difference between the second embodiment and the first embodiment is that the first polarity reversing circuit (60) reverses in polarity the picture signal for each one frame using the control signal from the synchronous control circuit (80). The first polarity reversing circuit 60 reverses the picture signal in polarity for each one horizontal scanning period (1H). FIGS. 2(a) through 2(d) show the driving waveforms to be applied upon the respective picture elements ⓐ, ⓑ, ⓒ, ⓓ of FIG. 3, FIGS. 2(e) through 2(h) show the brilliance of each picture element. Even in the case of the second embodiment as in the first embodiment, the flickers are caused with each picture element of four in the two-frame period, but the visual brilliance of FIG. 2(i) composes the brilliance of each picture element when four picture elements are regarded as one on the whole, the period of the flicker becomes one field to increase the frequency so that the flickers become substantially inconspicuous.

FIG. 4 is the other waveform chart showing the operation of the driving circuit of FIG. 3. In FIG. 4, Vv is a video signal reversed in polarity for each 1H and for 1 frame. VG$_1$, VG$_2$ ... VGN are gate signals to be applied upon the gate electrode lines (G), (G) ... of each electrode corresponding to the odd-numbered field, VP$_1$, VP$_2$, ... VPN are volts to be retained by the liquid crystals of the respective rows corresponding to the odd-numbered field.

First, the voltage of the video signal (Vv) sampled at the gate signal (VG$_1$) high timing in the 1H th in the odd-numbered field is applied upon the liquid crystal, the gate signal tries to be retained during the 1 frame period after it has become low, the charging and discharging operations are performed to the source electrode line through the off resistor of the TFT as described hereinbefore so that the holding voltage becomes like VP$_1$. The amount of the charging and discharge operation in the one frame depends upon the voltage of the video signal of the source electrode line, but the video signal reverses for each 1H so that the average voltage of the source electrode line in one frame becomes almost the same even in any portion of the picture face. Accordingly, the retaining voltages VP$_1$, VP$_2$, ... VPN respectively become the same charging and discharging amount as shown. This may be said likewise even in the even-numbered field. The hint at this time is in that the video signal is opposite in polarity to the former case when the same picture element is driven after one frame.

Thus, the uneven brilliance is not caused above and below the picture face.

Also, as the picture element adjacent to the horizontal direction is driven by the picture signals which are mutually opposite in polarity, the flickers through the AC driving of the adjacent picture elements are mutually offset visually, so that the flickers of the entire picture face are hardly caused even if the flickers of the individual picture element become the frequency as low as the two-frame period.

In the above-described embodiment, the polarity of the video signal is reversed for each 1H, but it may be reversed for each several Hs. Also, the polarity may be reversed for each adjacent plural picture elements.

According to the present invention as described hereinabove, a liquid-crystal display apparatus characterized in that the polarity of the picture signal is reversed for one horizontal scanning period or for each of a plurality of horizontal scanning periods in a liquid-crystal display apparatus wherein the picture signals reversed in polarity at the given period are applied upon the crystal panel with a plurality of display elements thereon is newly provided, so that the brilliance is not lowered in the lower portion of the picture face, the brilliance of the even-numbered line is not lowered as compared with the odd-numbered line in the interlace system so that uniformity is almost provided even in any portion on the picture face.

THIRD EMBODIMENT

Figure 5:
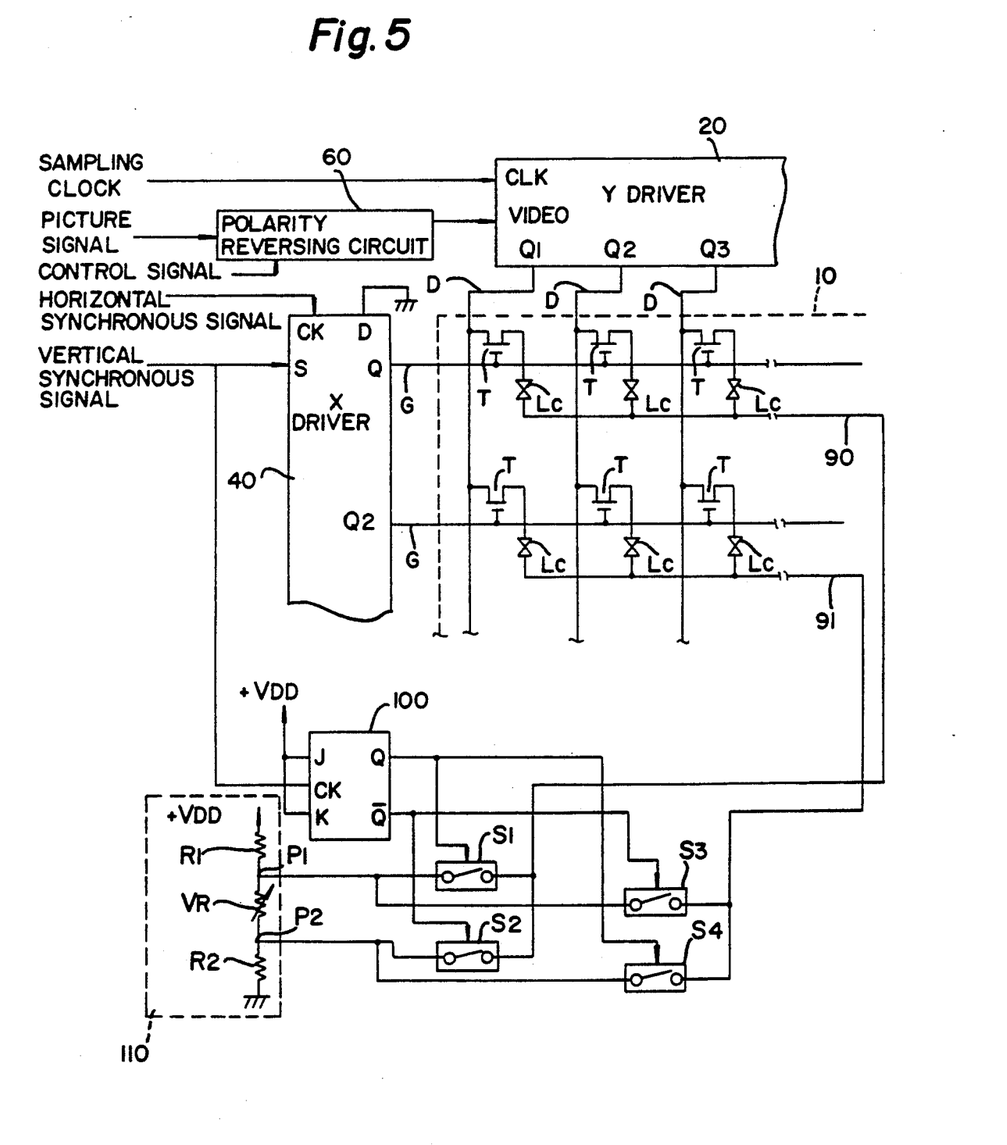
FIG. 5 is a circuit diagram of the driving circuit of the liquid-crystal display apparatus in the third embodiment of the present invention.

FIG. 5 shows a third embodiment of the present invention. FIG. 6 through FIG. 9 respectively show the modified embodiment of FIG. 5.

FIG. 5 is the circuit diagram of the circuit of the present embodiment, in the drawing 10 is a liquid-crystal panel of the known active matrix system, (T) shows the TFT (thin film transistor), (LC) shows the liquid-crystal. 20 is a Y driver which drives the respective drain lines (D), (D) of the TFT (T) which is composed of a shift register and a sample hold circuit so as to sample the picture signal with the given sampling clock. 40 is an X driver which is composed of a shift register and drives the respective gate lines (G), (G) ... of the TFT (T), (T), the data is set by one bit with the vertical synchronous signal, is shifted with the horizontal synchronous signal to sequentially select the given gate line to feed to the TFT (T), (T) ... the signal held by the Y driver.

100 is a J-K flip-flop (T-FF) where the output is reversed for each clock input (vertical synchronous signal), (S$_1$), (S$_2$), (S$_3$) and (S$_4$) are first, second, third and fourth analog switches to be controlled by the Q output and the $\overline{Q}$ output of the T-FF. 110 is a brilliance level adjusting circuit which is composed of a first resistor (R$_1$) connected between the DC power supply (+VDD) and ground, a variable resistor (VR) and a second resistor (R$_2$), the connection point (a first connection point) (P$_1$) between the first resistor (R$_1$) and the variable resistor (VR) is connected with the first analog switch (S$_1$), the connection point (a second connection point) (P$_2$) between the variable resistor (VR) and the second resistor (R$_2$) is connected with the second analog switch (S$_2$). The first and second analog switch outputs are connected with the opposite electrode line 90 of the liquid crystals (LC), (LC) . . . and the third and fourth analog switch outputs are connected with the opposite electrode line (91). It is to be noted that 60 is a polarity reversing circuit which reverses the picture signal in polarity at the field period with the control signal such as a vertical synchronous signal or the like.

The operation of the above-described circuit of the present embodiment will be described hereinafter.

First, as the T-FF 100 output reverses at the field period, for example, first and fourth analog switches (S$_1$) and (S$_4$) are on in the odd-numbered field and are off in the even-numbered field, and second and third analog switches (S$_2$) and (S$_3$) are off in the odd-numbered field and are on in the even-numbered field so as to perform the opening and closing operations. Thus, the high voltage (VH) of the first connection point (P$_1$) of the brilliance level adjusting circuit 110 is applied upon the opposite electrode line (90) in the odd-numbered field as shown in FIG. 5, and the low voltage (VL) of the second connection point (P$_2$) is applied upon the opposite electrode line (91), the voltage (VL) is applied upon the line (90) in the odd-numbered field, and the voltage (VH) is applied upon the line (91).

Figure 10:
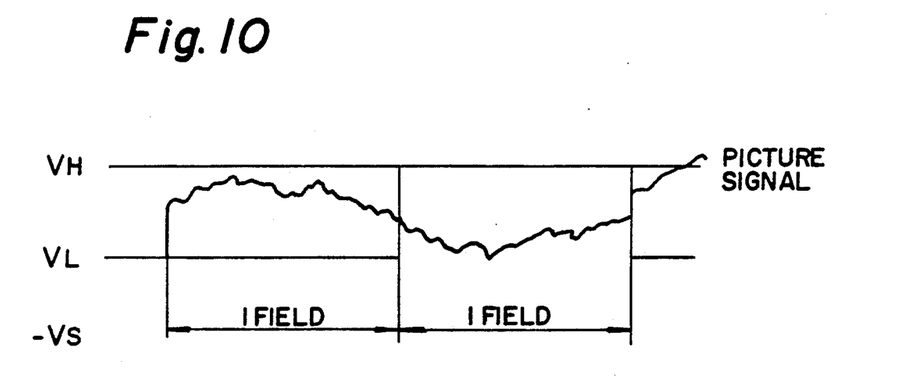
FIG. 10 is the waveform view showing the relationship between the opposed electrode electric potential in the circuit of FIG. 5 and the picture signal.

On one hand, the picture signal is reversed at the field period by the polarity reversing circuit (6) and the level is set between VH and VL as shown in FIG. 10.

When the brilliance level is changed, for example, when the brilliance is increased, the adjusting operation is required so that the resistance value of the variable resistor (VR) may be increased. Namely, the voltage (VH) of the first connection point (P$_1$) becomes higher, the voltage (VL) of the second connection point (P$_2$) becomes lower so that in FIG. 10, the voltage between the opposite electrode level and the picture signal level becomes larger and the brilliance becomes higher.

Figure 6:
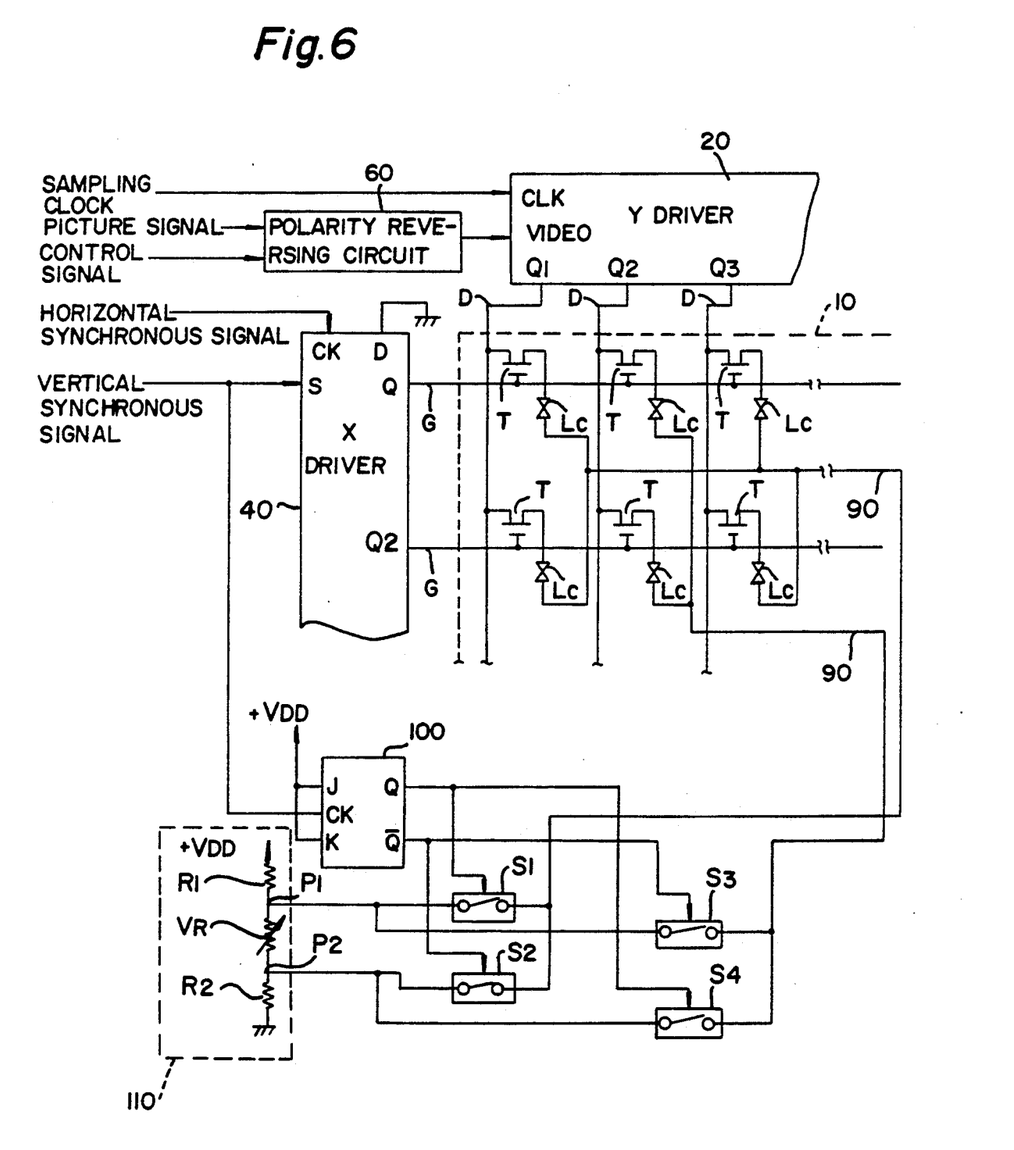
FIG. 6 through FIG. 9 are respectively the circuit diagrams showing the modified embodiments of FIG. 5.
Figure 7:
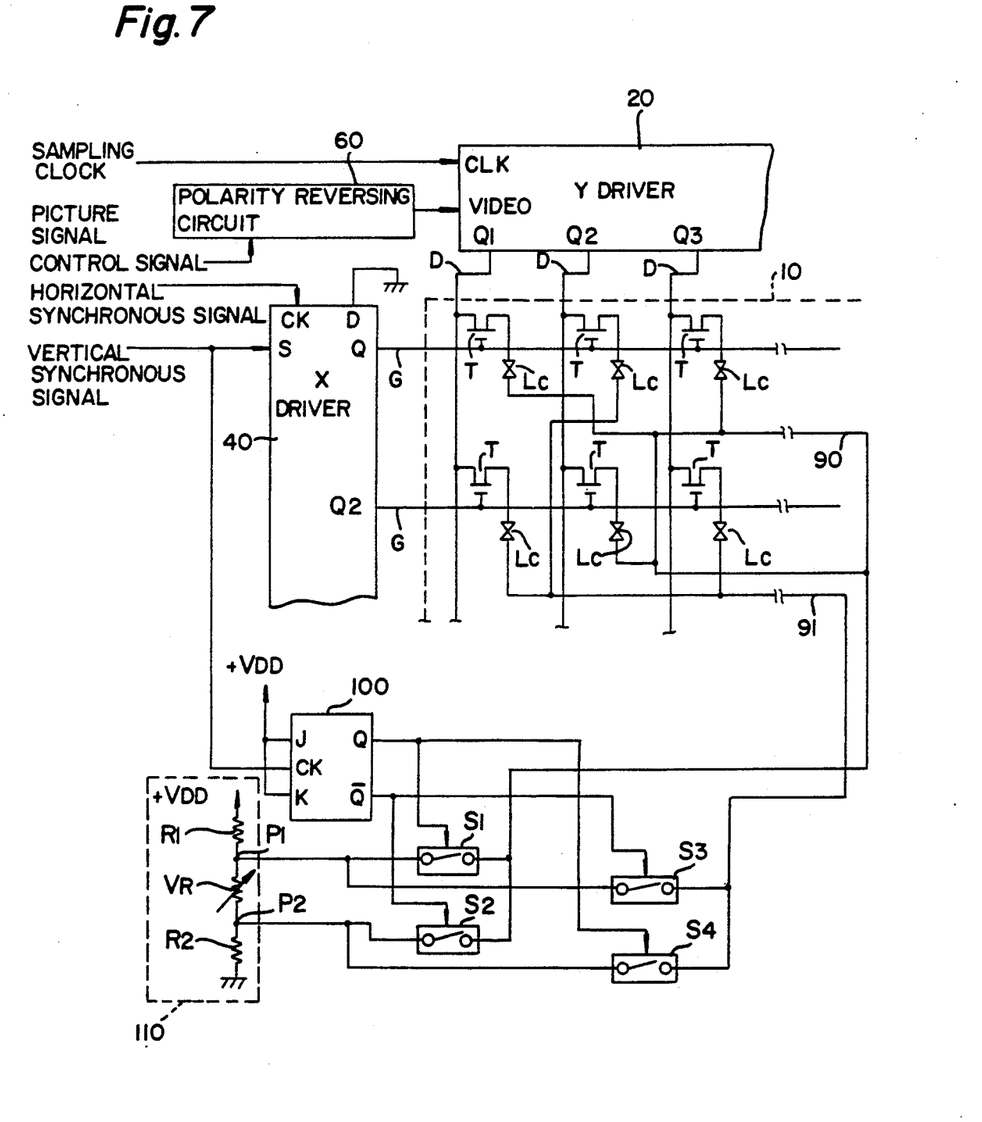
Figure 8:
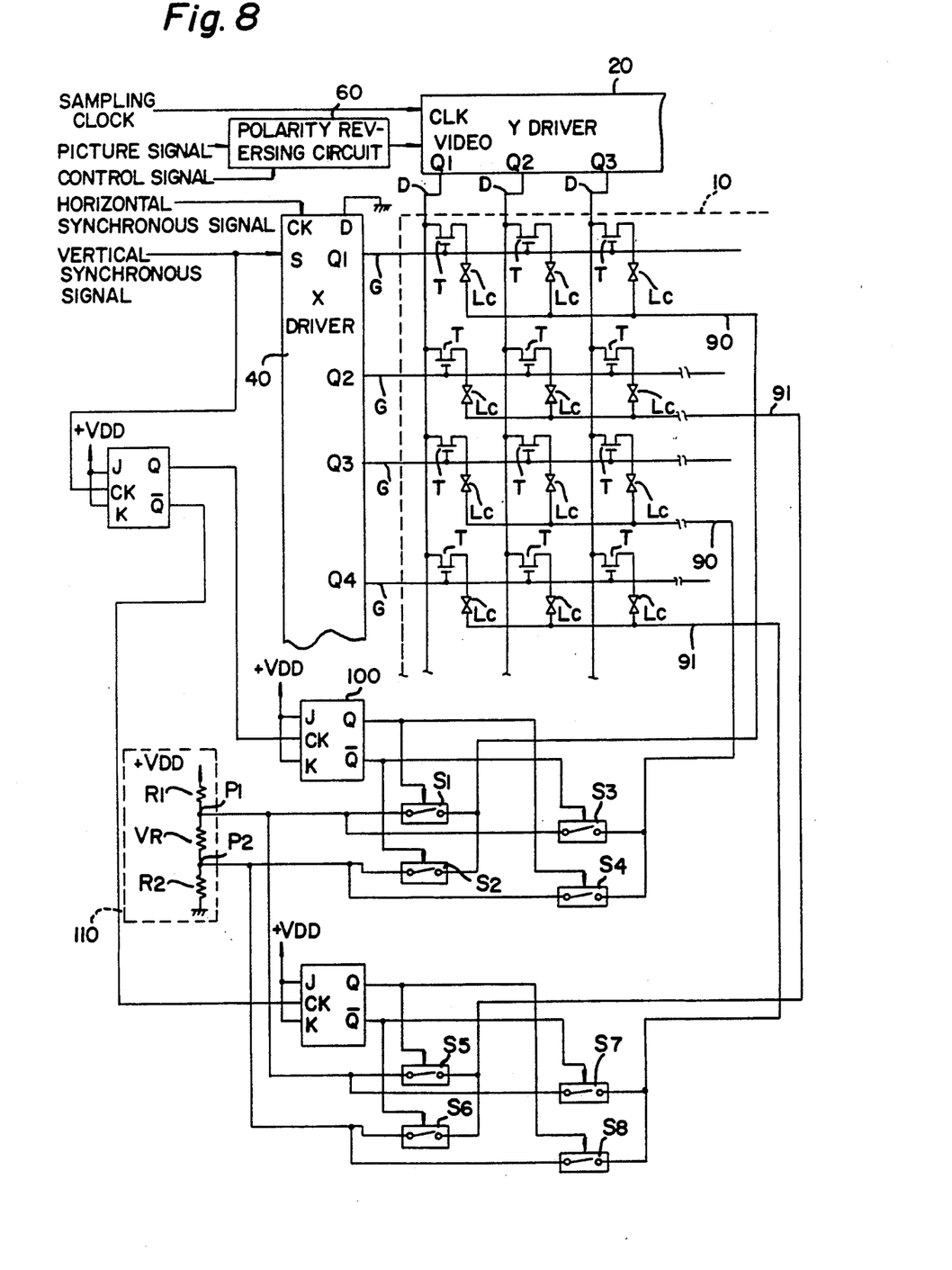
Figure 9:
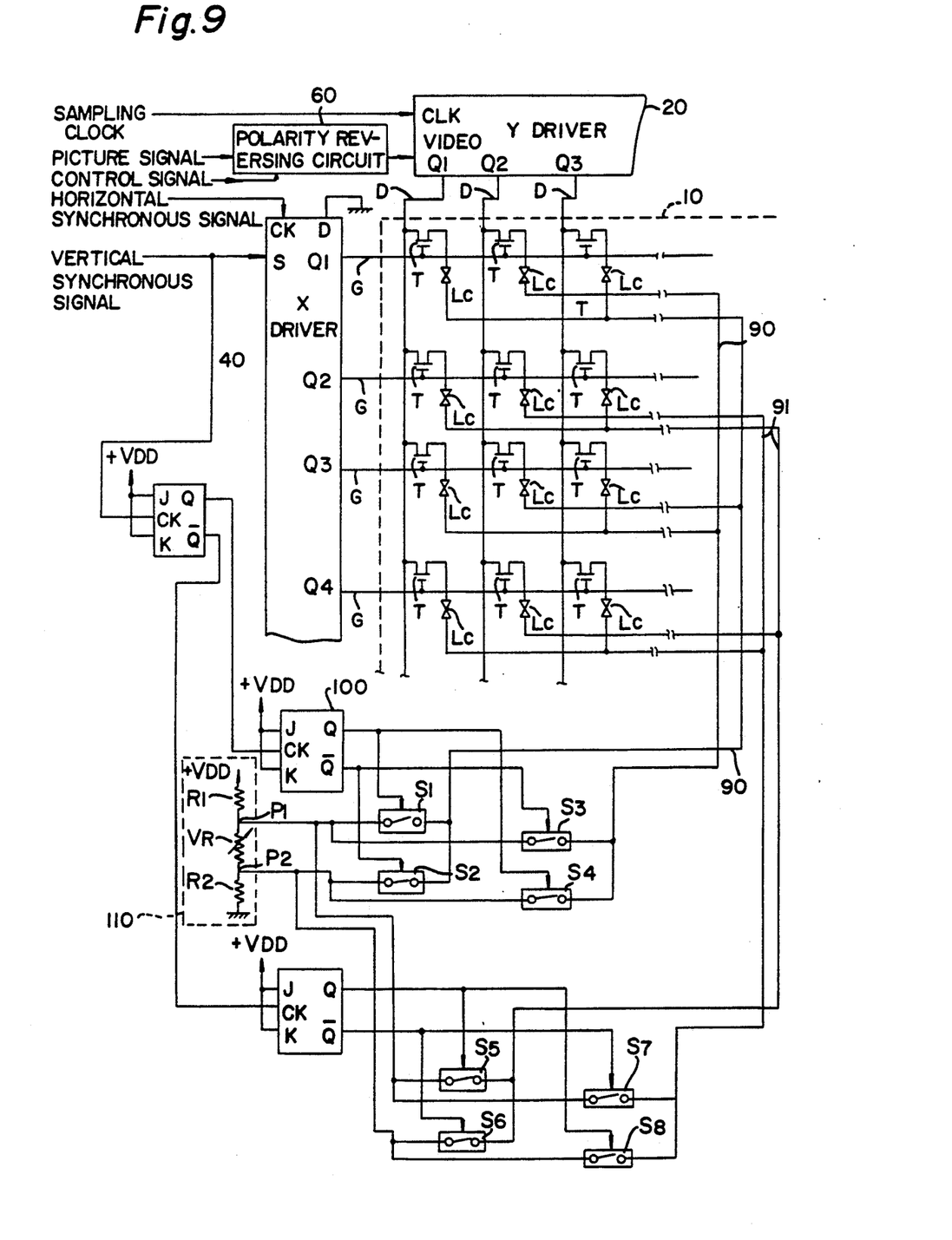

Furthermore, the circuit of the above-described FIG. 5 shows the line-switching one, as the modified embodiment of FIG. 5, FIG. 6 shows the dot-switching one, FIG. 7 shows both the line-, dot-switching one, FIG. 8 shows the line-switching one at a full line, FIG. 9 shows both the line-, dot-switching one at a full line, they are respectively capable of achieving the operational effects similar to that of FIG. 5.

As described hereinabove, the present invention newly provides the driving circuit for the liquid-crystal display apparatus, which is composed of a liquid-crystal panel with a plurality of display elements being arranged in columns and rows thereon, a polarity reversion circuit for reversing for each field the polarity of the picture signal to be applied upon the liquid-crystal panel, a circuit for feeding the first or second DC voltage selected for each field to the opposite electrode of the liquid-crystal panel, and a brilliance level adjusting circuit for simultaneously mutually varying in the opposite direction the first and second DC voltages to adjust the brilliance level of the picture signal, so that the brilliance of the picture signals may be adjusted very simply, the power-supply voltage will become half as much as that in the conventional example, thus realizing a small-sized liquid crystal TV of higher brilliance and lower power consumption.

We claim:

1. A liquid-crystal display apparatus comprising:

a liquid crystal panel including a plurality of display picture elements arranged in rows and columns and being arranged alternatively with one row of display picture elements to be selected for every odd field and a next row of display picture elements to be selected for every even field, and said liquid crystal panel being driven upon loading of a video signal to be held within each of the display picture elements for a period of two fields in one frame;

a control means for generating a control signal;

a first polarity reversing circuit connected with the control means for reversing polarity of the video signal at every two fields;

a second polarity reversing circuit connected with the first polarity reversing circuit for reversing a polarity of an output signal from the first polarity reversing circuit every time;

a first column drive means connected with the first polarity reversing circuit to load the video signal into odd numbered columns of the display picture elements;

a second column drive means connected with the second polarity reversing circuit to load the video signal into even numbered columns of the display picture elements;

a first row drive circuit connected to the control means to drive rows having been selected for a period of odd fields; and a second row drive circuit connected to the control means to drive rows having been selected for a period of even fields, wherein the video signal to be loaded into the display picture elements adjacent to each other in a row direction is mutually reversed in polarity at each row of the display picture elements, and the video signal to be loaded into the display picture elements adjacent to each other in a column direction is loaded at every two continued fields in a manner that the video signal is reversed in polarity at one field, but has a same polarity at a next field.

2. A liquid-crystal display apparatus comprising:

a liquid crystal panel including a plurality of display picture elements arranged in rows and columns and being arranged alternatively with one row of display picture elements to be selected for every odd field and a next row of display picture elements to be selected for every even field, and said liquid crystal panel being driven upon loading of a video signal to be held within each of the display picture elements for a period of two fields in one frame;

a control means for generating a control signal;

a first polarity reversing circuit connected with the control means for reversing polarity of the video signal at each line and at every two fields;

a second polarity reversing circuit connected with the first polarity reversing circuit for reversing a polarity of an output signal from the first polarity reversing circuit every time;

a first column drive means connected with the first polarity reversing circuit to load the video signal into odd numbered columns of the display picture elements;

a second column drive means connected with the second polarity reversing circuit to load the video signal into even numbered columns of the display picture elements;

a first row drive circuit connected to the control means to drive rows having been selected for a period of odd fields; and a second row drive circuit connected to the control means to drive rows having been selected for a period of even fields, wherein the video signal to be loaded into the display picture elements adjacent to each other in a row direction is mutually reversed in polarity at each row of the display picture elements, and the video signal to be loaded into the display picture elements adjacent to each other in a column direction is loaded at every two continued fields in a manner that the video signal is reversed in polarity at one field, but has a same polarity at a next field.

* * * * *